United States Patent
Riley et al.

(10) Patent No.: US 10,497,952 B2
(45) Date of Patent: Dec. 3, 2019

(54) VEHICLE FUEL CELL PURGING SYSTEM

(71) Applicant: FORD GLOBAL TECHNOLOGIES, LLC, Dearborn, MI (US)

(72) Inventors: Matthew Riley, Ann Arbor, MI (US); Craig Michael Mathie, White Lake Township, MI (US); Kevin Wujcik, Ann Arbor, MI (US); William Frederick Sanderson, Jr., Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 15/701,970

(22) Filed: Sep. 12, 2017

(65) Prior Publication Data

US 2019/0081337 A1    Mar. 14, 2019

(51) Int. Cl.
*H01M 8/04303* (2016.01)
*H01M 8/04746* (2016.01)
*H01M 8/04701* (2016.01)

(52) U.S. Cl.
CPC ... *H01M 8/04303* (2016.02); *H01M 8/04701* (2013.01); *H01M 8/04746* (2013.01); *H01M 2250/20* (2013.01)

(58) Field of Classification Search
CPC ......... H01M 8/04303; H01M 8/04701; H01M 8/04746; H01M 2250/20
USPC ........................................................ 429/429
See application file for complete search history.

(56) References Cited

U.S. PATENT DOCUMENTS

| 7,960,062 | B2 | 6/2011 | Owejan et al. |
| 8,168,343 | B2 | 5/2012 | Clingerman et al. |
| 8,900,766 | B2 | 12/2014 | Rogahn et al. |
| 9,070,921 | B2 | 6/2015 | Cartwright et al. |
| 2006/0040150 | A1* | 2/2006 | Yu ............... H01M 8/04231 429/429 |
| 2007/0111046 | A1* | 5/2007 | Spare ............ H01M 8/04231 429/429 |
| 2007/0275275 | A1 | 11/2007 | Scharf |
| 2008/0075991 | A1 | 3/2008 | LaVen et al. |
| 2008/0241608 | A1 | 10/2008 | Zhang et al. |
| 2015/0311547 | A1 | 10/2015 | Clingerman et al. |

\* cited by examiner

*Primary Examiner* — Gary D Harris
(74) *Attorney, Agent, or Firm* — David Kelley; Brooks Kushman P.C.

(57) ABSTRACT

A vehicle includes a fuel cell having a stack for generating power and a controller. The controller is programmed to, in response to a fuel cell temperature decreasing to less than a temperature threshold after a shutdown, initiate a primary purge of the stack and terminate the primary purge at a predetermined anode pressure.

13 Claims, 5 Drawing Sheets

VEHICLE FUEL CELL PURGING SYSTEM

TECHNICAL FIELD

The present disclosure relates to vehicles having fuel cells.

BACKGROUND

Vehicles may include fuel cell systems that generate electrical power.

SUMMARY

A vehicle includes a fuel cell having a stack for generating power and a controller. The controller is programmed to, in response to a fuel cell temperature decreasing to less than a temperature threshold after a shutdown, initiate a primary purge of the stack and terminate the primary purge at a predetermined anode pressure.

A vehicle a fuel cell having a stack and a controller. The controller is programmed to, responsive to a fuel cell temperature decreasing to less than a temperature threshold after a shutdown, initiate a primary purge of the stack. The controller is further programmed to, responsive to a cross-pressure between an anode of the fuel cell and a cathode of the fuel decreasing to less than a pressure threshold after termination of the primary purge, initiate a secondary purge of the stack.

A fuel cell purging method includes purging a fuel cell stack after a shutdown in response to, a difference between anode and cathode pressures of the stack decreasing to a pressure threshold or in response to a fuel cell temperature decreasing to an above-freezing threshold while the anode pressure is less than the cathode pressure and the difference is greater than the pressure threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
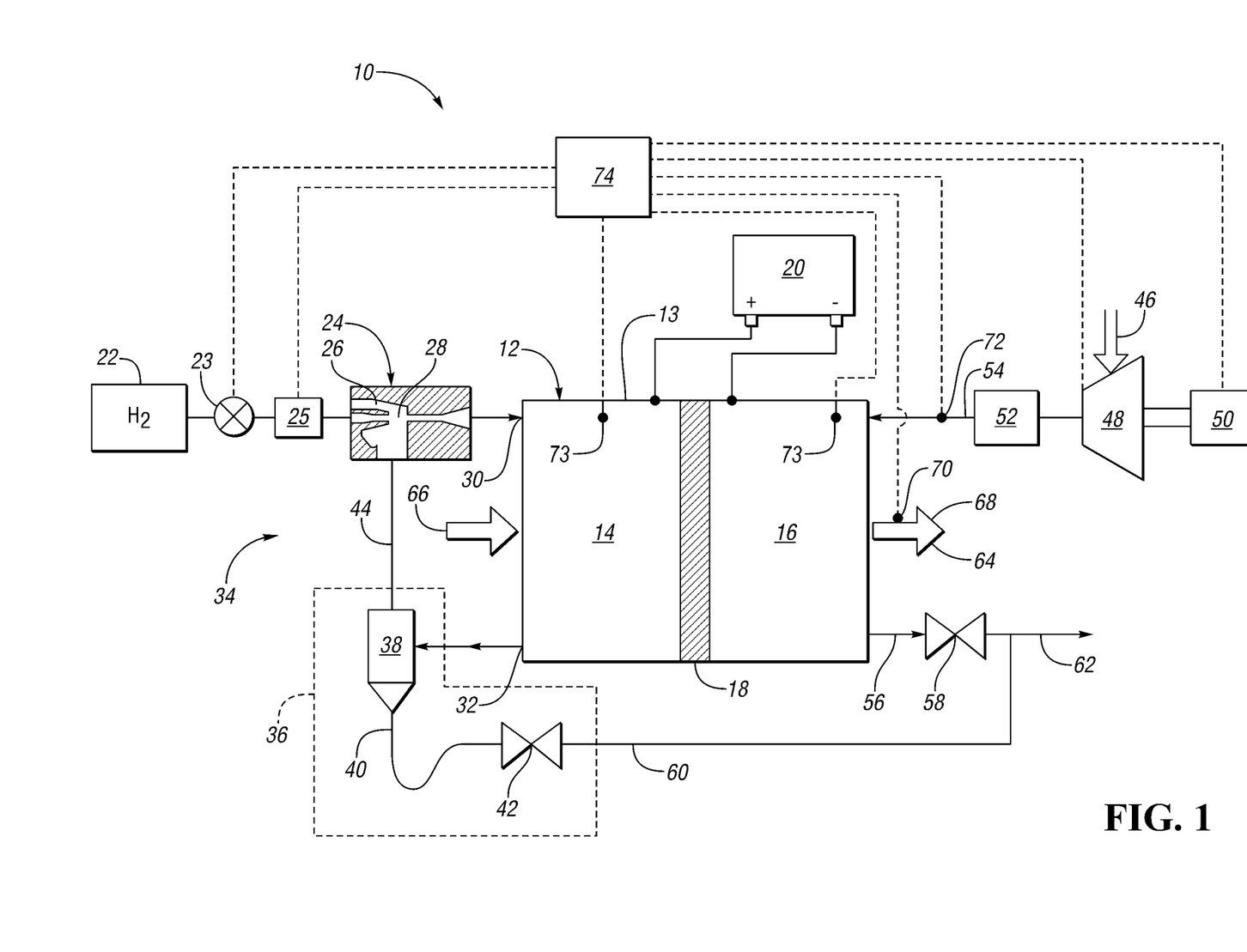
FIG. 1 is a schematic diagram representative of a fuel cell system.

FIG. 1 schematically illustrates a fuel cell system ("the system") 10 as a process flow diagram according to at least one embodiment. For example, system 10 may be used in a vehicle to provide electrical power to operate an electric motor to propel the vehicle or perform other vehicle functions. The system 10 may be implemented in a fuel cell based electric vehicle or a fuel cell based hybrid vehicle or any other such apparatus that uses electrical current to drive various devices.

The system 10 has a fuel cell stack ("the stack") 12. The stack 12 includes multiple cells, with each cell 13 having an anode side 14 (including an anode catalyst), a cathode side 16 (including a cathode catalyst), and a membrane 18 between the anode and cathode catalyst. Only one fuel cell 13 of the fuel cell stack 12 is illustrated in FIG. 1, although the stack 12 contains any number of cells. The stack 12 electrically communicates with and provides energy, for example, to a high voltage bus or a traction battery 20. The stack 12 generates stack current in response to electrochemically converting hydrogen and oxygen. The stack 12 may also have a cooling loop (not shown).

Various electrical devices may be coupled to the battery 20 to consume such power in order to operate. If the system 10 is used in connection with a vehicle, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the system 10, product water, residual fuel such as hydrogen, and byproducts such as nitrogen, may accumulate at the anode side 14 of the stack 12. Attempts have been made to remove the liquid product water and byproducts and to reuse the residual hydrogen and at least a portion of the water vapor. One approach is to collect those constituents in a purge assembly 36 downstream of the stack 12, separate at least a portion of the liquid water, and return the remaining constituents to the stack 12 via a return passageway in a recirculation loop.

A primary fuel source 22 is connected to the anode side 14 of the stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve 23 controls the flow of the supply hydrogen. A pressure regulator 25 regulates the flow of the supply hydrogen.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the stack 12. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, under normal operating conditions, hydrogen is provided to the fuel cell stack 12 above a stoichiometric ratio of one, i.e. at a fuel-rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24, as shown, or an active anode recirculation rotary device. The stream in passageway 44 may contain a substantial amount of hydrogen compared to the stream in drain line 40. The fluid in passageway 44 is fed into the converging section of the converging-diverging nozzle 28 where it mixes with incoming hydrogen from the nozzle 26 and hydrogen source 22.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes 18 for each cell 13 remain humidified to provide for optimal operation of the stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the system 10.

The stack 12 may be cooled using a coolant loop 64 as is known in the art. The coolant loop 64 has an inlet 66 and an outlet 68 to the stack 12 to cool the stack. The coolant loop 64 may have a temperature sensor 70 to determine the coolant temperature.

The stack 12 may also have a humidity sensor 72 positioned at the inlet 54 to the cathode side 16 of the stack 12. The sensor 72 may also include a temperature sensing module. Pressure sensors 73 may be utilized to determine the respective pressures within the anode side 14 of the stack 12 and the cathode side 16 of the stack 12. Temperature sensors (not shown) may also be utilized to determine the respective temperature within the anode side 14 of the stack 12 and the cathode side 16 of the stack 12.

A controller 74 receives signals from the sensors 70, 72, 73, and any other sensor that may be associated with the fuel cell system 10. The controller 74 may be a single controller or multiple controllers in communication with one another. The controller 74 may also be in communication with the valve 23, regulator 25, valve 42, valve 58, compressor 48, and motor 50.

During operation, the stoichiometric ratio of total reactant per reactant electrochemically needed for both reactants of the fuel cell system may be controlled based on the fuel cell operating state, environmental conditions, and the like. The stoichiometry may be controlled by using the valve 23 and regulator 25 on the anode side 14 to control the flow rate of fuel or hydrogen to the stack 12, and by using the compressor 48 and motor 50 on the cathode side 16 to control the flow rate of air to the stack 12. The system 10 may be operated through a range of fuel and air stoichiometric ratios. As the system 10 is operated at a lower power level, the amount of water byproduct will decrease, as the amount of current drawn from the stack 12 decreases.

Figure 2:
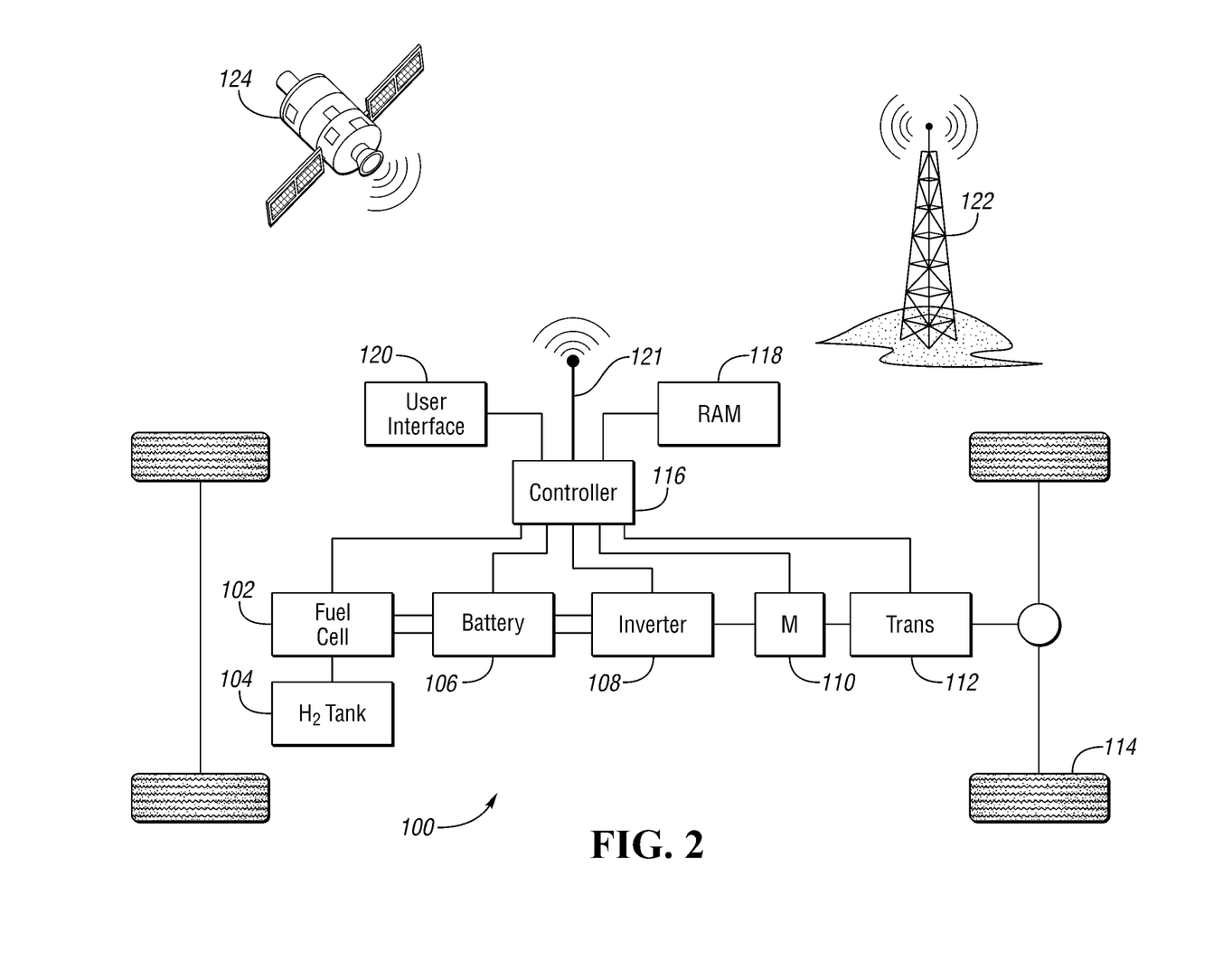
FIG. 2 is a schematic diagram representative of a vehicle that includes a fuel cell system.

FIG. 2 illustrates a vehicle 100 having a fuel cell system ("the system") 102 according to an embodiment. The system 102 may be a fuel cell system as described with respect to FIG. 1. The system 102 receives hydrogen from a storage tank 104 and air from the ambient environment to operate, and provides electrical energy to a battery 106 for storage. The battery 106 is connected to an inverter 108, which in turn powers an electric machine 110. The electric machine 110 may act as a motor to propel the vehicle 100, and in some embodiments, act as a generator to charge the battery 106. The electric machine 110 is connected to a transmission 112. The transmission 112 is connected to wheels 114 of the vehicle 100.

The vehicle has a control system 116. The control system 116 may include any number of controllers, and may be integrated into a single controller, or have various modules.

Some or all of the controllers may be connected by a controller area network (CAN) or other system. The control system 116 may be connected to random access memory 118 or another data storage system. In some embodiments, the vehicle has a user interface 120 in communication with the control system 116. The user interface 120 may include an on-board vehicle system, and may also include a receiver configured to receive information and inputs from a remote user using a cellular phone, a computer, or the like. The user interface may also include a navigation system.

The control system 116 is in communication and is configured to control the system 102, battery 106, inverter 108, electric machine 110, and transmission 112. The control system 116 is also configured to receive signals from these vehicle components related to their status and the vehicle state.

The control system 116 has a receiver 121, which may include one or more antennae. Each antenna may be configured to wirelessly receive signals from various sources, including, but not limited to, cellular towers 122, satellites 124, wireless network servers, and the like.

Figure 3A:
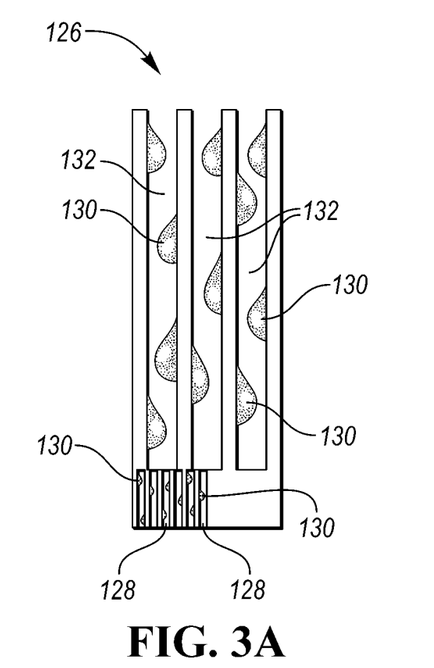
FIG. 3A illustrates an anode of fuel cell in an unrestricted non-vacuum state.
Figure 3B:
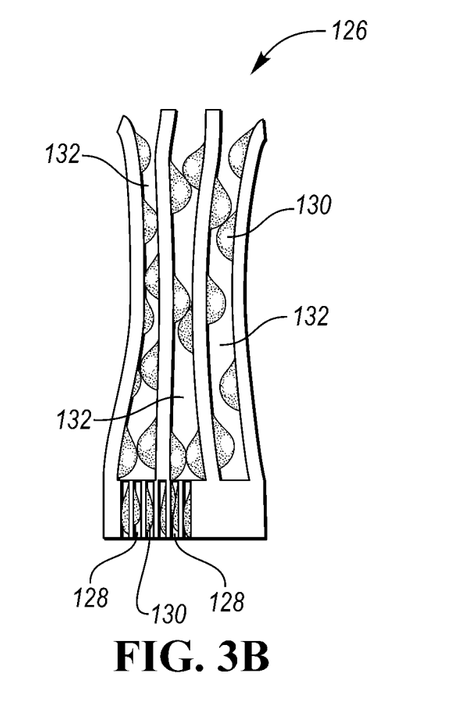
FIG. 3B illustrates the anode of the fuel in a restricted vacuum state.

Referring to FIGS. 3A and 3B, an anode 126 in an unrestricted state and the anode 126 in a restricted state caused by a vacuum pressure in the anode (or a negative cross-pressure between the anode and cathode) are illustrated, respectively. After a conventional stack purge is complete, hydrogen permeates to the cathode where it reacts with oxygen. As the hydrogen is consumed after the conventional stack purge and while the anode subsystem is closed, anode pressure may drop to below atmospheric pressure (i.e., a vacuum pressure) or there may be a negative cross-pressure between the anode and the cathode. The cross-pressure of the fuel cell system 10 may refer to the difference between the anode pressure and the cathode pressure (i.e., the pressure of the anode side 14 of the fuel cell stack 12 minus the pressure of the cathode side 16 of the fuel cell stack 12). Anode pressure may also drop to below the pressures in the cathode and coolant loops of the cells. Any pliable components in the anode may flex under the vacuum pressure and the gas passages within the anode may collapse or constrict due to the vacuum pressure (or the negative cross-pressure). The movement of pliable materials may also cause liquid water to move from one location to another. In particular, water may move into the output 32 of the anode (which may comprise a series of narrow channels referred to as outlet vias). The flow through the anodes, particularly the anode outlet vias 128, can become restricted when liquid water and/or ice 130 forms and blocks the anode outlet pathways of the cells, rendering the cell dead-ended.

One or more cells in a fuel cell stack may go into reversal (cell voltage of around −1 volts or lower) during system startup under freezing conditions. These reversals are typically due to lack of sufficient hydrogen at the anode catalyst. Under such conditions hydrogen may be prevented from getting to the anode catalyst while removal of waste materials (nitrogen, argon, water vapor) may also be prevented. Furthermore, the gas passages in the cell components, such as the outlet vias 128, the flow fields 132, and the gas diffusion layer (which includes the anode catalyst) may become constricted or collapsed under the vacuum pressure or the negative cross-pressure.

Water movement and potential ice blockage is not the only concern surrounding anode pressure during a cold soak. The potential exists for the anode to become frozen in the constricted state, as shown in FIG. 3B, if the temperature of the fuel cell drops while the anode is in under a vacuum pressure. The net effect may be permanent deformation of the membranes 18 in the cells 13 resulting in a smaller anode volume that cannot be increased to its normal state volume when positive pressure is applied with the introduction of fuel during a start. Since there will be less volume in the passageways for fuel to navigate to reach the anode catalyst and for exhaust gases to exit the cells through the vias 128, such a situation could also result in cell voltage reversal.

Test data has shown that pressure differences between the anode and cathode in each fuel cell have a significant effect on the amount of anode water that drains out of the stack and into the balance of plant (i.e., channels beyond the outlet vias 128 or the water separator/knock-out device 38) during cold soaks (i.e., the time period after a purge where the fuel cell system is shutdown), when there is no active control of the fuel cell system taking place. The test data indicated that once a certain anode vacuum pressure relative to cathode pressure threshold was crossed, a significant amount of water moved out of the anode side of the stack and into the anode knock-out device 38, or other balance of plant components. Furthermore, the test data indicated that the deeper the anode pressure during soak, the more water was removed from the anode side of the stack. After a minimum pressure (or lowest negative cross-pressure) in the anode is reached during cold soak, water stopped moving from the anodes into the balance of plant.

Figure 4:
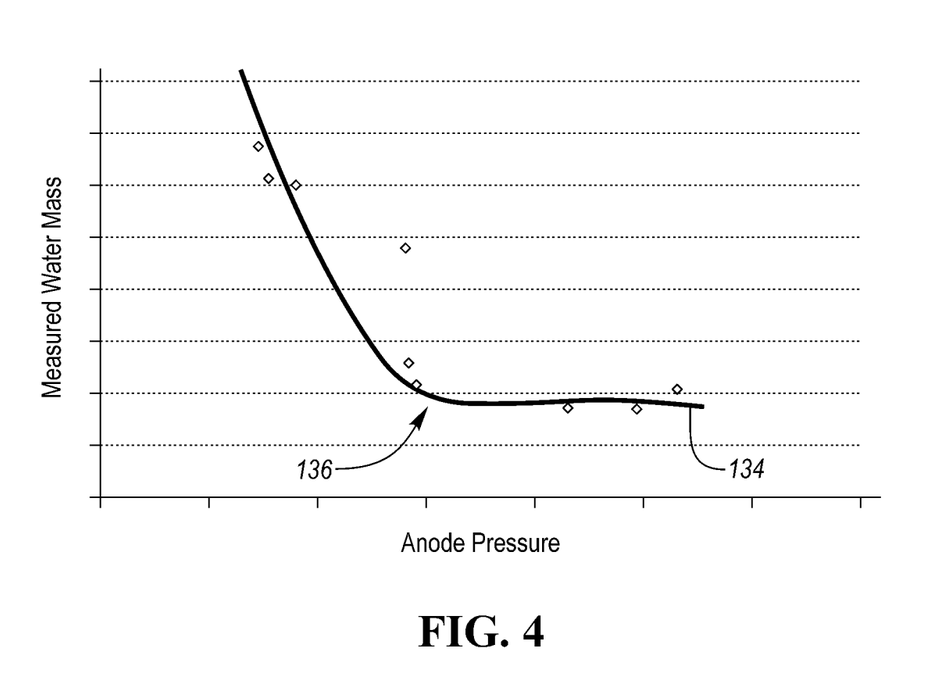
FIG. 4 is a graph illustrating the relationship between anode pressure and water transport from anode during a cold soak after a purging event.

Referring to FIG. 4, Line 134 depicts the relationship between anode pressure (in this case with a cathode open to atmosphere) and the amount of water accumulation within the anode knock-out device 38 or other balance of plant components during a cold soak after a purging event. At anode pressures above the bend 136 in line 134, very little water moved out of the anodes of the stack. If the anode pressure drops below the bend 136, the amount of water moving out of the anode and into the anode knock-out device 38 or the other balance of plant components significantly increases. After the bend 136, water accumulation in the anode knock-out or other balance of plant devices increases as pressure continues to decrease during a cold soak. The test data has also indicated that the lower the anode pressure at the end of the stack purge event, the lower the ultimate anode pressure that can be achieved during the cold soak. Lower anode pressures during soak result in more water removal from the stack anodes.

Figure 5:
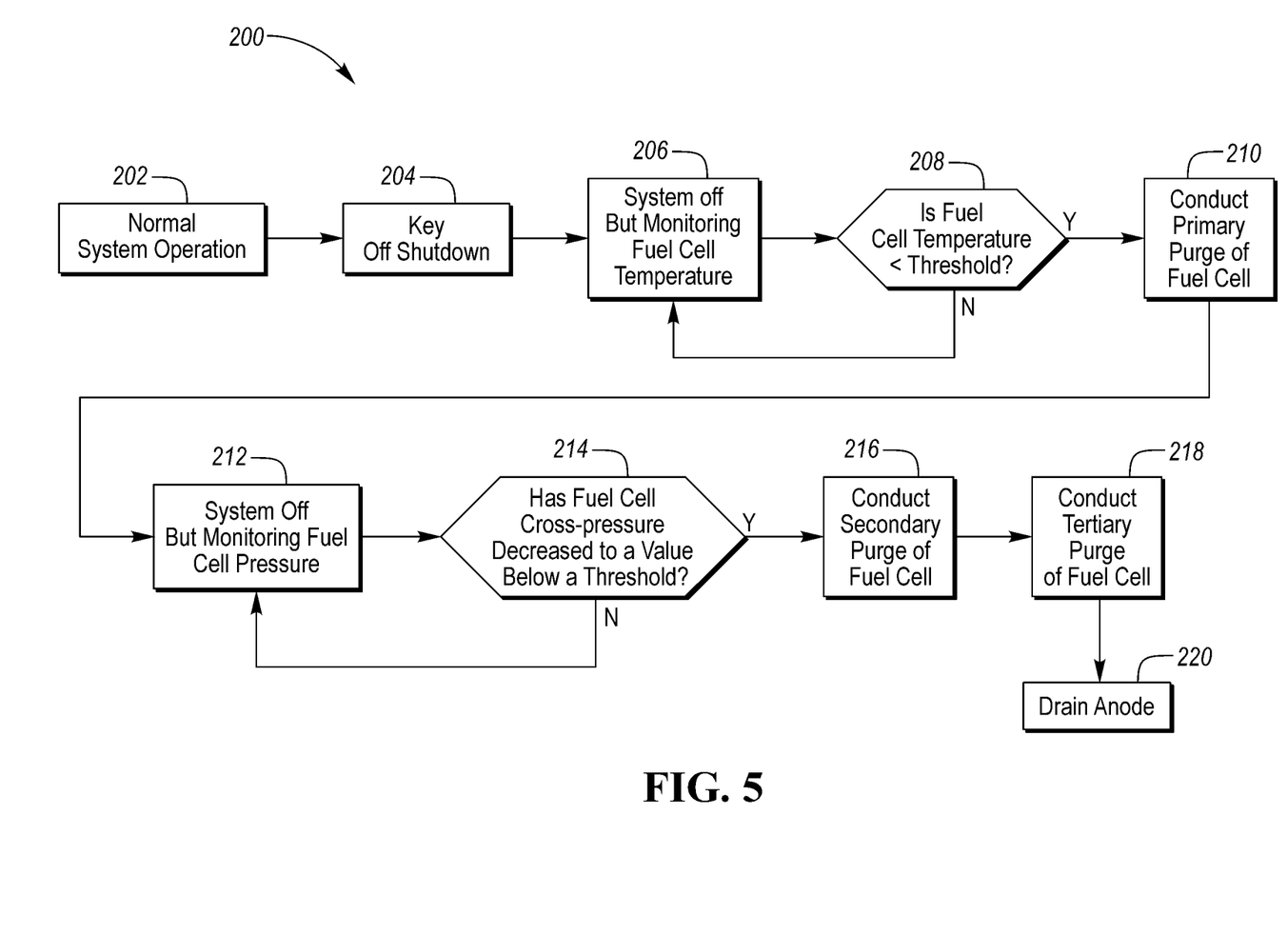
FIG. 5 is a flowchart illustrating a method of purging a fuel cell.

Referring to FIG. 5, a flowchart illustrating a method 200 of purging a fuel cell system is illustrated. The method 200 may be implemented by any of the controllers described above. The method 200 may be stored as control logic and/or algorithms within a controller. The controller may be configured to control the operation various components of the fuel cell system 10 and/or vehicle 100 in response to various conditions of the fuel cell system 10 and/or vehicle 100. The method 200 begins with the vehicle 100 in a normal system operation at block 202 where the vehicle is running. Once the vehicle 100 is turned off by a key off shutdown at block 204, the fuel cell system 10 turns off but continues to monitor the temperature of the fuel cell stack 12 at block 206. The temperature of the fuel cell stack 12 may refer to the physical temperature of the stack 12 itself or to the temperature of the coolant within the coolant loop 64.

While the fuel cell system 10 is monitoring the temperature of the fuel cell stack 12, it is determined at block 208 if fuel cell temperature is less than a temperature threshold. If the fuel cell temperature is not less than the temperature threshold, the method 200 continues to monitor the temperature of the fuel cell stack 12 at block 206. If the fuel cell temperature is less than the threshold, the method 200 moves on to block 210 where a primary purge of the fuel cell stack 12 is initiated.

The primary purge of the fuel cell stack 12 may include flowing hydrogen gas through the anode side 14 of the stack 12 and flowing air through the cathode side 16 of the stack 12. The primary purge may then be terminated at a predetermined anode pressure. The primary purge may also require a minimum time period to elapse prior to being terminated. The predetermined anode pressure may be slightly larger than atmospheric pressure. For example, the predetermined anode pressure may range anywhere between 1.00 and 2.00 atmospheres of pressure. Alternatively, the primary purge may include flowing air through the cathode side 16 of the stack 12 alone. In the alternative embodiment, the anode side 14 of the stack may be closed or may be open to atmospheric pressure.

Once the primary purge has ended at block 210, the method 200 moves on to block 212 where the fuel cell system 10 is again off but continues to monitor the pressures within the fuel cell stack 12 (i.e., the anode and cathode pressures). While the fuel cell system 10 is monitoring the pressures within the fuel cell stack 12, it is determined at block 214 if the cross-pressure of the fuel cell system 10 has decreased to a value that is below a pressure threshold. The pressure threshold may correspond to a negative cross-pressure (i.e., where anode pressure is less than cathode pressure). If the cross-pressure of the fuel cell system 10 is not less than the pressure threshold, the method 200 continues to monitor the cross-pressure of the fuel cell system 10 at block 212. If the cross-pressure of the fuel cell system 10 is less than the pressure threshold, the method moves on to block 216 were a secondary purge of the fuel cell stack 12 is initiated.

The secondary purge of the fuel cell stack 12 may include flowing hydrogen gas through the anode side 14 of the fuel cell stack 12 and flowing air through the cathode side 16 of the fuel cell stack 12. The secondary purge may then be terminated at predetermined anode pressure, after a predetermined minimum time has elapsed, and/or a predetermined minimum number of pressure cycles. The predetermined anode pressure may be larger than the predetermined anode pressure for the primary purge and thus, also larger than atmospheric pressure. In a first alternative, the secondary purge may include flowing air through both the anode side 14 and the cathode side 16 of the fuel cell stack 12. In a second alternative, the secondary purge may include flowing hydrogen gas through the anode side 14 of the fuel cell stack 12 alone. In the second alternative, the secondary purge may then be terminated at predetermined anode pressure, after a predetermined minimum time has elapsed, and/or a predetermined minimum number of pressure cycles. The predetermined anode pressure may be larger than the predetermined anode pressure for the primary purge and thus, also larger than atmospheric pressure. In a third alternative, the secondary purge may include flowing air through the cathode side 16 of the stack 12 alone. In the third alternative, the anode side 14 of the stack may be closed or may be open to atmospheric pressure.

Once the secondary purge has ended at block 216, the method 200 may initiate a tertiary purge of the fuel cell stack 12 at block 218 or the method 200 may skip the tertiary purge and move on to block 220 where the anode side 14 of the fuel cell stack 12 is drained, which may occur by opening the valve 42. If a tertiary purge is conducted, the tertiary purge may include flowing hydrogen gas through the anode side 14 of the fuel cell stack 12 and flowing air through the cathode side 16 of the fuel cell stack 12. The tertiary purge may terminate at an anode pressure that is higher than the ending pressure of the primary pressure. The tertiary purge may only be conducted if the secondary purge was conducted according to the third alternative where air is flowed through the cathode side 16 of the stack 12 alone. Additionally, if a tertiary purge is conducted, the method 200 may include draining the anode side 14 of the fuel cell stack 12 at block 220 following the tertiary purge. It should be understood that the flowchart in FIG. 5 is for illustrative purposes only and that the method 200 should not be construed as limited to the flowchart in FIG. 5. Some of the steps of the method 200 may be rearranged while others may be omitted entirely.

Figure 6:
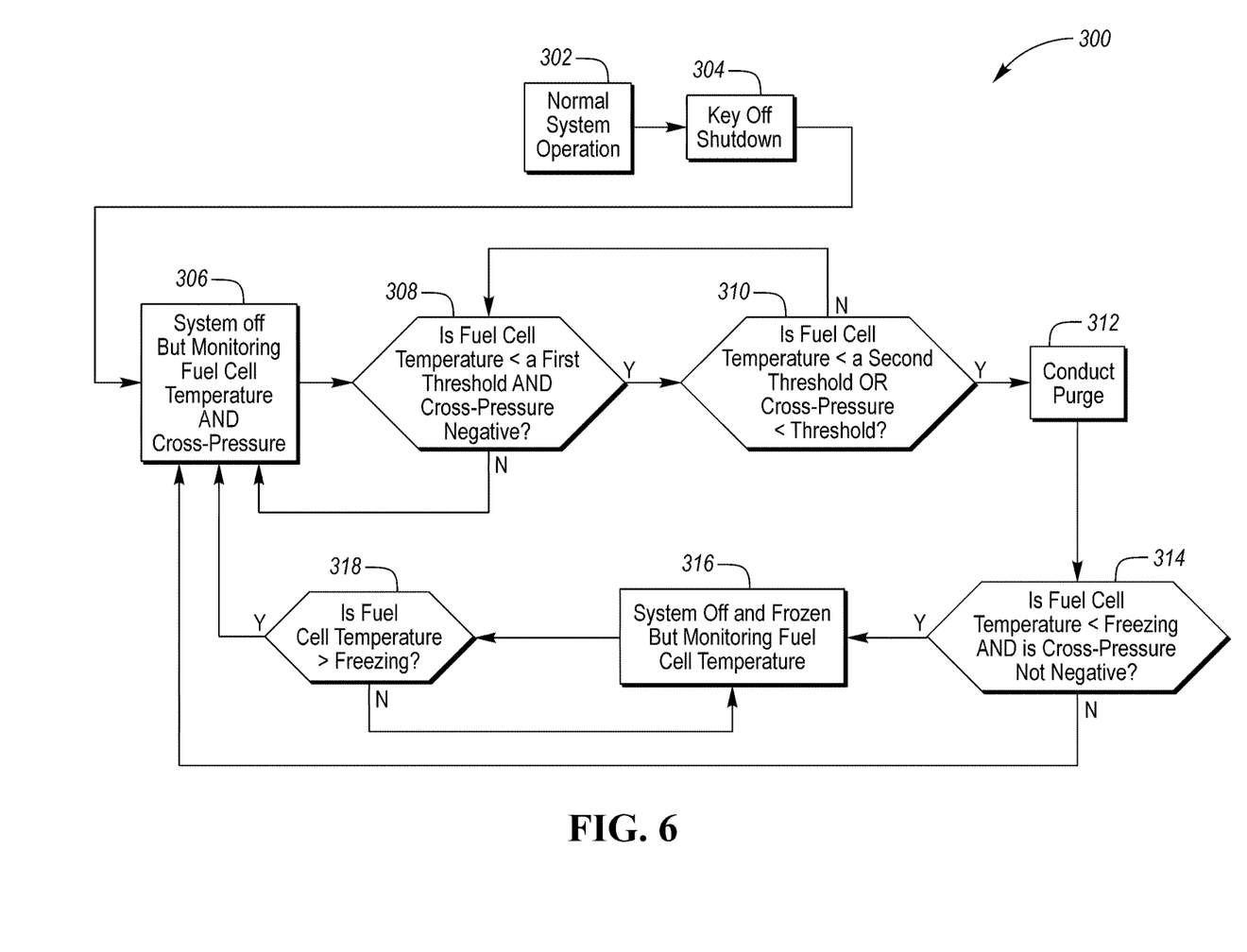
FIG. 6 is a flowchart illustrating an alternative embodiment of a method of purging a fuel cell.

Referring to FIG. 6, an alternative embodiment of a method 300 of purging a fuel cell system is illustrated. The method 300 may be implemented by any of the controllers described above. The method 300 may be stored as control logic and/or algorithms within a controller. The controller may be configured to control the operation of various components of the fuel cell system 10 and/or vehicle 100 in response to various conditions of the fuel cell system 10 and/or vehicle 100. The method 300 begins with the vehicle 100 in a normal system operation at block 302 where the vehicle is running. Once the vehicle 100 is turned off by a key off shutdown at block 304, the fuel cell system 10 turns off but continues to monitor the temperature of the fuel cell stack 12 and the cross-pressure between the anode and the cathode at block 306. The temperature of the fuel cell stack 12 may refer to the physical temperature of the stack 12 itself or to the temperature of the coolant within the coolant loop 64. The method 300 may optionally include a purge of the fuel cell stack 12 after the key off shutdown at block 304 and prior to monitoring the fuel cell at block 306. The fuel cell stack 12 may be purged between blocks 304 and 306 according to any of the purging steps described above with respect to the method 200 in the FIG. 5.

While the fuel cell system 10 is monitoring the temperature of the fuel cell stack 12 and the cross-pressure between the anode and the cathode at block 306, it is determined at block 308 if the temperature of the fuel cell stack 12 is less than a first temperature threshold and if the cross-pressure between the anode and the cathode is negative (i.e., the anode pressure is less than the cathode pressure). The first temperature threshold may correspond to a temperature value that is sufficiently higher than the freezing temperature of water (i.e., 32° F.) such that freezing of the fuel cell system 10 is not likely. If the temperature of the fuel cell stack 12 is not less than the first temperature threshold or the cross-pressure between the anode and the cathode is not negative, the method 300 continues to monitor the temperature of the fuel cell stack 12 and the cross-pressure between the anode and the cathode at block 306. If the temperature of the fuel cell stack 12 is less than the first temperature threshold and the cross-pressure between the anode and the cathode is negative, the method 300 moves on to block 310.

At block 310 it is determined if the temperature of the fuel cell stack 12 is less than a second temperature threshold or if the cross-pressure between the anode and the cathode is less than a pressure threshold. The second temperature threshold may correspond to a temperature value that is slightly higher than the freezing temperature of water, but within a range that freezing is likely to occur. For example, the second temperature threshold may range from a fraction of a degree higher than 32° F. to 45° F. The pressure threshold may correspond to a minimum pressure where water stops moving out of the anode and into the anode knock-out device 38, as described above. If the fuel cell stack 12 is not less than the second temperature threshold and the anode pressure is not less than the pressure threshold, the method 300 returns to block 308. If the fuel cell stack 12 is less than the second temperature threshold or the anode pressure is less than the pressure threshold, the method 300 moves on to block 312.

At block 312 the fuel cell stack 12 is purged. The purge at block 312 may include flowing hydrogen gas through the anode side 14 of the fuel cell stack 12 alone. The purge may include restoring the pressure of the fuel cell stack 12 to a positive cross-pressure between the anode and the cathode. During the purge, the anode side 14 of the fuel cell stack 12 can either remain closed to the atmosphere to maintain hydrogen concentration within the anode and restore the anode volume to its pre-constricted state, or it could be temporarily opened to atmosphere to permit the drainage of liquid water by opening the valve 42.

Alternatively, the purge at block 312 may include flowing hydrogen gas through the anode side 14 of the fuel cell stack 12 and flowing air through the cathode side 16 of the fuel cell stack 12 at initial rates. After a period of time has elapsed during the purge, the rate of airflow through the cathode side 16 of the fuel cell stack 12 is decreased to less than the initial flow rate while the initial flowrate of hydrogen gas through the anode side 14 of the fuel cell stack 12 is maintained. Once the rate of airflow through the cathode side 16 of the fuel cell stack 12 is decreased, an electric load may be applied to the fuel cell to consume the oxygen in the cathode side 16 of the fuel cell stack 12 while hydrogen gas is still be supplied to be supplied to the anode side 14 of the fuel cell stack 12. The lack of oxygen in the cathode side 16 of the fuel cell stack 12 may prevent the anode side 14 of the fuel cell stack 12 from going into a significantly negative cross-pressure between the anode and the cathode. Purging the fuel cell stack 12 at block 312 according to the alternative process will also leave the anode side 14 and cathode side 16 of the fuel cell stack 12 in a hydrogen rich environment which may reduce carbon corrosion during the subsequent start of the fuel cell system 10.

Once the purge is complete, the method 300 moves on to block 314 where it is determined if the temperature of the fuel cell stack 12 is less than the freezing temperature of water (i.e., 32° F.) and if the cross-pressure between the anode and the cathode is not negative. If the temperature of the fuel cell stack 12 is less than the freezing temperature of water and the cross-pressure between the anode and the cathode is not negative, the method 300 moves on to block 316, where the fuel cell system 10 is considered to be frozen and turns off, but continues to monitor the temperature of the fuel cell stack 12. If the temperature of the fuel cell stack 12 is not less than the freezing temperature of water or if the cross-pressure between the anode and the cathode is negative at block 314, the method 300 returns to block 306.

Under a scenario at block 314 where the temperature of the fuel cell stack 12 is less than the freezing temperature of water and the cross-pressure between the anode and the cathode is negative, the method 300 will move through blocks 306, 308, 310, and onto block 312 where a purge is conducted and terminated once the cross-pressure between the anode and the cathode is at a predetermined positive value (i.e., where anode pressure is greater than cathode pressure). Once the cross-pressure between the anode and the cathode is at the predetermined positive value, the method 300 will move through block 314 and onto block 316.

While the fuel cell system 10 is monitoring the temperature of the fuel cell stack 12 at block 316, it is determined at block 318 if the temperature of the fuel cell stack 12 is greater than the freezing temperature of water. If the temperature of the fuel cell stack 12 is not greater than the freezing temperature of water, the method 300 continues to monitor the temperature of the fuel cell stack 12 at block 316. If the temperature of the fuel cell stack 12 is greater than the freezing temperature of water, the method 300 returns to block 306. It should be understood that the flowchart in FIG. 6 is for illustrative purposes only and that the method 300 should not be construed as limited to the flowchart in FIG. 6. Some of the steps of the method 300 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising: a fuel cell having a stack for generating power, the stack having an anode and a cathode; a first valve located at an outlet of the anode; a second valve located at an outlet of the cathode: and a controller programmed to, in response to a fuel cell temperature decreasing to less than a temperature threshold after a shutdown, initiate a primary purge of the stack, wherein the primary purge includes flowing hydrogen gas into and out of the anode by opening the first valve and flowing air into and out of the cathode by opening the second valve, and in response to an anode pressure obtaining a predetermined value during the primary purge, terminate the primary purge and close the first and second valves, wherein the controller is programmed to, in response to a cross-pressure between the anode and the cathode decreasing to less than a pressure threshold after termination of the primary purge while the first and second valves are closed, initiate a secondary purge of the stack.

2. The vehicle of claim 1, wherein the secondary purge includes flowing hydrogen gas through the anode and flowing air through the cathode.

3. The vehicle of claim 1, wherein the secondary purge includes flowing air through the cathode alone.

4. The vehicle of claim 3, wherein the anode is open to atmosphere during the secondary purge.

5. The vehicle of claim 3, wherein the anode is closed to atmosphere during the secondary purge.

6. The vehicle of claim 3, wherein the controller is programmed to, in response to termination of the secondary purge, initiate a tertiary purge of the stack.

7. The vehicle of claim 6, wherein the tertiary purge includes flowing hydrogen gas through the anode and flowing air through the cathode.

8. The vehicle of claim 1, wherein the secondary purge includes flowing hydrogen gas through the anode alone.

9. The vehicle of claim 1, wherein the secondary purge includes flowing air through the anode and the cathode.

10. A vehicle comprising:
   a fuel cell having a stack, the stack having an anode and a cathode; and
   a first valve located at an outlet of the anode;
   a second valve located at an outlet of the cathode; and
   a controller programmed to,
      responsive to a fuel cell temperature decreasing to less than a temperature threshold after a shutdown, initiate a primary purge of the stack, wherein the primary pump includes flowing air into and out of the cathode alone via opening second valve while the first valve remains closed,
      responsive to a cross-pressure between an anode and a cathode of the stack decreasing to less than a pressure threshold after termination of the primary purge while the first and second valves are closed, initiate a secondary purge of the stack, wherein the secondary purge includes flowing hydrogen gas into and out of the anode by opening the first valve and flowing air into and out of the cathode by opening the second valve, and
      responsive to a termination condition during the secondary purge, terminate the secondary purge and close the first and second valves.

11. The vehicle of claim 10, wherein the anode is open to atmosphere during the primary purge.

12. The vehicle of claim 10, wherein the termination condition is an anode pressure obtaining a predetermined value.

13. The vehicle of claim 10, wherein the termination condition is the elapsing of a predetermined time period after the start of the secondary purge.

* * * * *